(12) United States Patent
Kim et al.

(10) Patent No.: US 11,970,214 B2
(45) Date of Patent: Apr. 30, 2024

(54) VEHICLE BODY FOR ELECTRICAL VEHICLE

(71) Applicants: HYUNDAI MOTOR COMPANY, Seoul (KR); KIA CORPORATION, Seoul (KR)

(72) Inventors: Hyun Sik Kim, Seoul (KR); Se Ho Ryu, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 282 days.

(21) Appl. No.: 17/307,767

(22) Filed: May 4, 2021

(65) Prior Publication Data
US 2021/0362786 A1    Nov. 25, 2021

(30) Foreign Application Priority Data
May 19, 2020    (KR) .......................... 10-2020-0059602

(51) Int. Cl.
*B62D 25/20*    (2006.01)
*B60K 1/04*    (2019.01)
(Continued)

(52) U.S. Cl.
CPC ............ *B62D 25/2036* (2013.01); *B60K 1/04* (2013.01); *B60L 50/66* (2019.02); *B60K 2001/0438* (2013.01); *B60L 3/0007* (2013.01); *B60L 50/64* (2019.02); *B60Y 2200/91* (2013.01); *B60Y 2200/92* (2013.01); *B60Y 2306/01* (2013.01);
(Continued)

(58) Field of Classification Search
CPC ............... B62D 25/2036; B62D 21/15; B62D 25/2027; B62D 25/00; B62D 25/20; B62D 21/152; B62D 21/02; B62D 21/155; B60K 1/04; B60K 2001/0438; B60L 50/66;
(Continued)

(56) References Cited

U.S. PATENT DOCUMENTS

2016/0090003 A1\*    3/2016    Hirota .................... B60L 3/0007
                                                                180/68.5
2019/0276093 A1\*    9/2019    Tatsuwaki .......... B62D 25/2036
(Continued)

FOREIGN PATENT DOCUMENTS

DE    102018008465 A1 \*    4/2020    ............... B60K 1/04
JP       2018188021 A  \*  11/2018
KR    10-2019-0021167 A    3/2019

*Primary Examiner* — Amy R Weisberg
*Assistant Examiner* — Dana D Ivey
(74) *Attorney, Agent, or Firm* — Lempia Summerfield Katz LLC

(57) ABSTRACT

A vehicle body for an electrical vehicle includes: side sills, which are coupled to side surfaces of a floor panel, rear side members, front end portions of which overlap rear end portions of the side sills and which are coupled the side surfaces of the floor panel, a battery, which is positioned at a lower portion of the floor panel and is mounted to portions of the side sills in front of the rear side members and to portions at which the side sills overlap the rear side members, and rear extension members having a strength lower than any of the side sills and the rear side members, the rear extension members being connected at front ends thereof to rear ends of the rear side members, and the rear extension members being coupled to the side surfaces of the floor panel.

16 Claims, 13 Drawing Sheets

(51) Int. Cl.
  *B60L 50/60* (2019.01)
  *B60L 3/00* (2019.01)
  *B60L 50/64* (2019.01)
  *B62D 21/02* (2006.01)
  *B62D 21/15* (2006.01)
  *B62D 25/00* (2006.01)

(52) U.S. Cl.
  CPC ......... *B60Y 2400/112* (2013.01); *B62D 21/02* (2013.01); *B62D 21/15* (2013.01); *B62D 21/152* (2013.01); *B62D 25/00* (2013.01); *B62D 25/20* (2013.01); *B62D 25/2027* (2013.01); *Y02T 10/70* (2013.01)

(58) Field of Classification Search
  CPC ........ B60L 3/0007; B60L 50/64; Y02T 10/70; B60Y 2200/91; B60Y 2306/01; B60Y 2400/112
  USPC .................. 296/204, 193.07, 187.08, 187.11
  See application file for complete search history.

(56) References Cited

U.S. PATENT DOCUMENTS

2020/0385056 A1\* 12/2020 Kubota .............. B62D 25/2027
2020/0385058 A1\* 12/2020 Kubota ................ B62D 21/152
2020/0406734 A1\* 12/2020 Choi ........................ B60K 1/04

\* cited by examiner

VEHICLE BODY FOR ELECTRICAL VEHICLE

CROSS-REFERENCE TO RELATED APPLICATION

This application claims priority to and the benefit of Korean Patent Application No. 10-2020-0059602, filed on May 19, 2020, the entire disclosure of which are incorporated herein by reference.

FIELD

The present disclosure relates to a vehicle body of an electrical vehicle to improve the structure of the vehicle body.

BACKGROUND

The statements in this section merely provide background information related to the present disclosure and may not constitute prior art.

A conventional internal-combustion vehicle is developed mainly with the aim of protecting a fuel tank upon collision at a rear portion thereof. The reason for this is because fire may occur at the vehicle when oil leaks due to damage to the fuel tank and thus injury to passengers and enormous damage to the ambient environment of the accident site may be caused.

Meanwhile, an electrical vehicle does not include a fuel tank but includes a high-voltage battery. Because the high-voltage battery may also cause a fire when the battery ruptures in the event of a collision at the rear portion of the vehicle.

However, we have discovered that because the structures of conventional vehicle bodies are designed mainly to protect the fuel tanks of internal-combustion vehicles and a high-voltage battery has a shape, a mounting position in the vehicle, a structure and the like, which are different from those of a fuel tank, the conventional vehicle body has a problem of being incapable of adequately protecting the high-voltage battery.

Details described as the background art are intended merely for the purpose of promoting the understanding of the background of the present disclosure and should not be construed as an acknowledgment of the prior art that is previously known to those of ordinary skill in the art.

SUMMARY

The present disclosure provides a vehicle body for an electrical vehicle capable of inhibiting or preventing collision energy from being transmitted to a high-voltage battery by virtue of improvement in the structure of the rear portion of the vehicle body.

In one form of the present disclosure, a vehicle body for an electrical vehicle includes: side sills, which extend anteroposteriorly alongside surfaces of a floor panel and are coupled thereto, rear side members, front end portions of which overlap rear end portions of the side sills and which extend rearwards along the side surfaces of the floor panel and are coupled thereto, a battery, which is positioned at a lower portion of the floor panel and is mounted to portions of the side sills in front of the rear side members and to portions at which the side sills overlap the rear side members, and rear extension members having a strength lower than any of the side sills and the rear side members, the rear extension members being connected at front ends thereof to rear ends of the rear side members, and the rear extension members extending rearwards along the side surfaces of the floor panel and being coupled thereto.

Rear end portions of the rear side members may be coupled to front end portions of the rear extension members in an overlapping state.

The vehicle body may further include a spring seat coupled to lower surfaces of portions at which the rear side members overlap the rear extension members.

The vehicle body may further include a first cross member, which is disposed between the rear side members and is coupled thereto, and to a middle portion of which the battery is mounted.

The vehicle body may further include a second cross member disposed between the rear extension members and coupled thereto, and a subframe, which is mounted to two ends of the first cross member, which is connected to the rear side members, and to two ends of the second cross members, which are connected to the rear extension members.

The first cross member may be coupled to the rear side members, which are positioned behind overlapping zones in which the side sills overlap the rear side members.

The first cross member may be provided with a battery-mounting portion on a rear surface of a middle portion thereof, and a battery-mounting bracket may be vertically disposed between the battery-mounting portion and the battery and connected thereto.

The battery-mounting portion may be composed of a mounting bracket, which is additionally coupled to a rear surface of the first cross member, or a mounting surface formed on the rear surface of the first cross member.

The battery-mounting bracket may be coupled at a lower end thereof to a rear end of the battery and at an upper end thereof to the battery-mounting portion.

The vehicle body may further include a second cross member, disposed between the rear extension members and coupled thereto, and a reinforcing mounting member, disposed between the first cross member and the second cross member and connected thereto.

The reinforcing mounting member may extend anteroposteriorly between the battery-mounting portion and the second cross member, and may be connected thereto.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
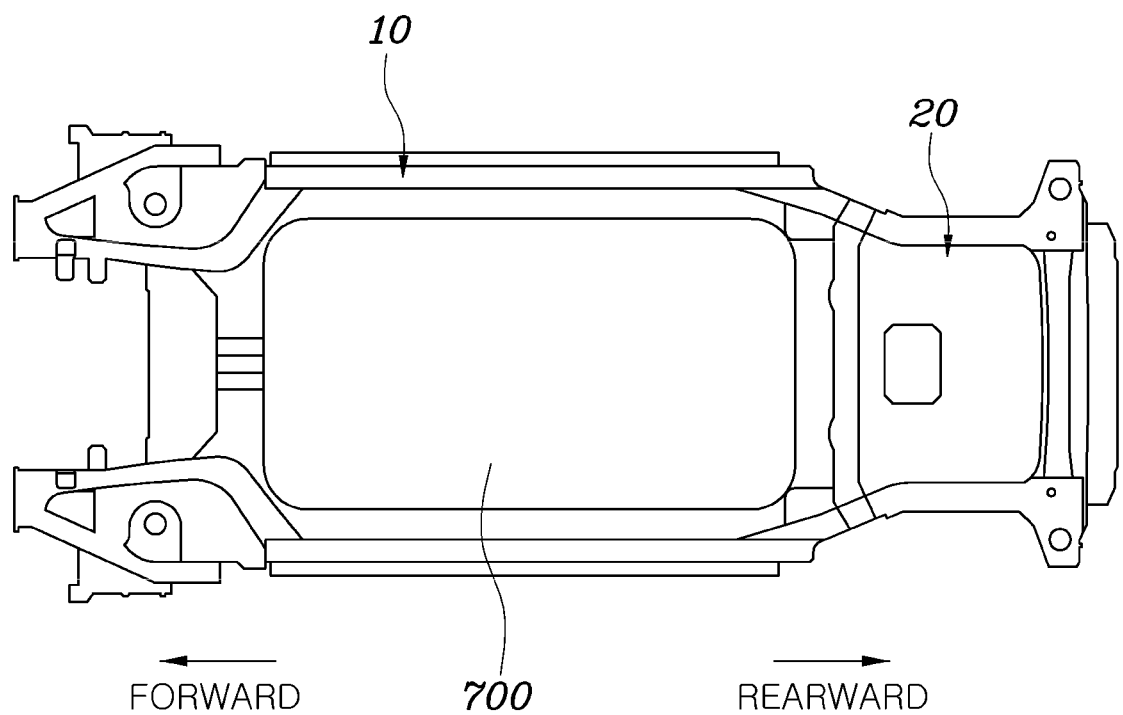
FIG. 1 is a view illustrating a mounting position of a high-voltage battery mounted on a lower portion of a vehicle body according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, examples of which are illustrated in the accompanying drawings. Wherever possible, the same reference numbers will be used throughout the drawings to refer to the same or like parts.

Figure 2:
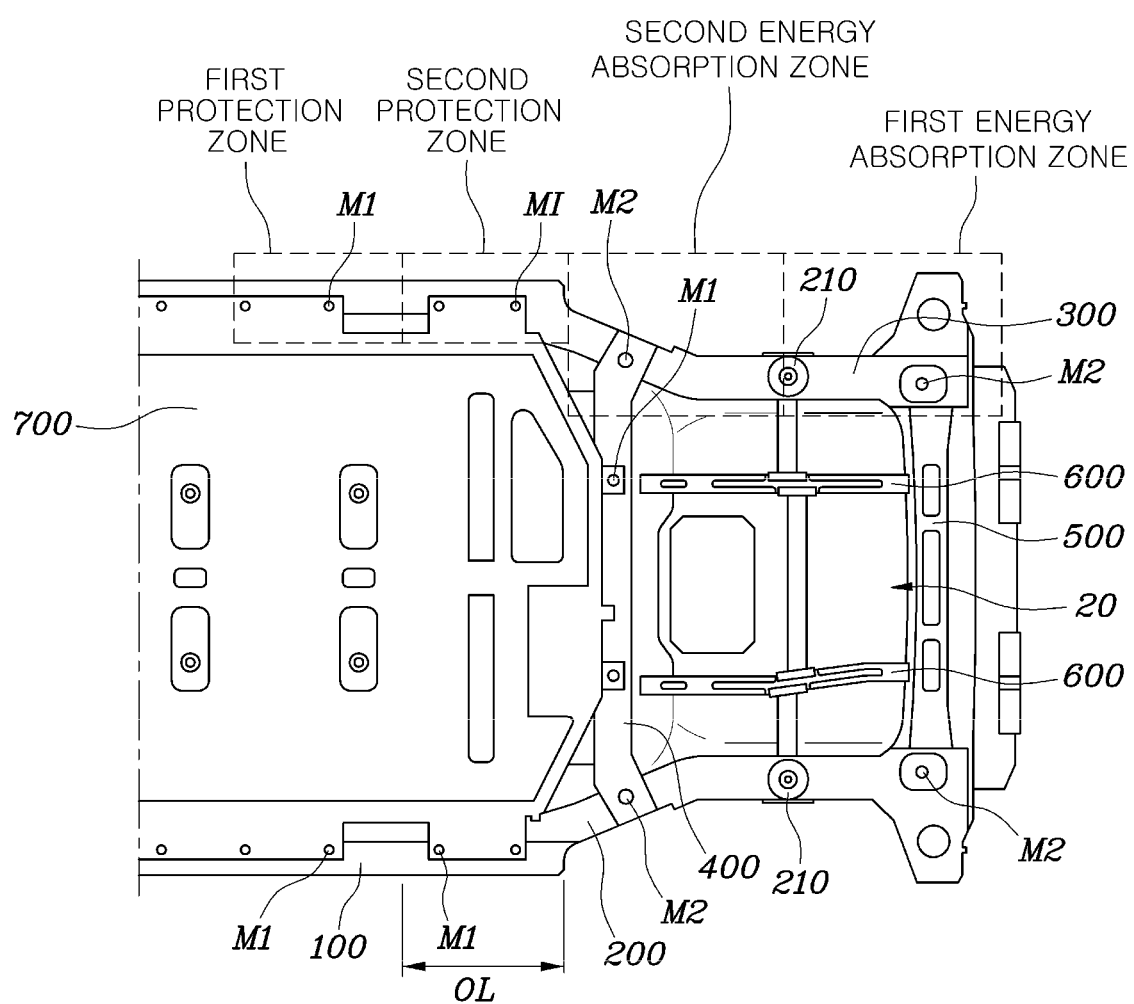
FIG. 2 is a view illustrating the structure of the lower portion of the vehicle body on which the high-voltage battery is mounted in one form of the present disclosure.

FIG. 1 is a view illustrating the position at which a high-voltage battery 70 is mounted on a lower portion of a vehicle body according to an exemplary form of the present disclosure. FIG. 2 is a view illustrating the structure of the lower portion of the vehicle body on which the high-voltage battery 700 is mounted according to one form of the present disclosure.

Referring to the drawings, a floor panel is mounted on the lower portion of the vehicle body. The floor panel is composed of a center floor panel 10, positioned at the center of the lower portion of the vehicle body, and a rear floor panel 20, connected to the rear end of the center floor panel 10.

The high-voltage battery 700 (hereinafter, referred to as the "battery"), which has a size corresponding to the width and length of the lower portion of the center floor panel 10, is mounted on the lower portion of the center floor panel 10.

Accordingly, the battery 700 is mounted to members that surrounds the battery 700 and constitute the vehicle body. By virtue of the mounting structure, the battery 700 is stably coupled to the vehicle body.

Figure 3:
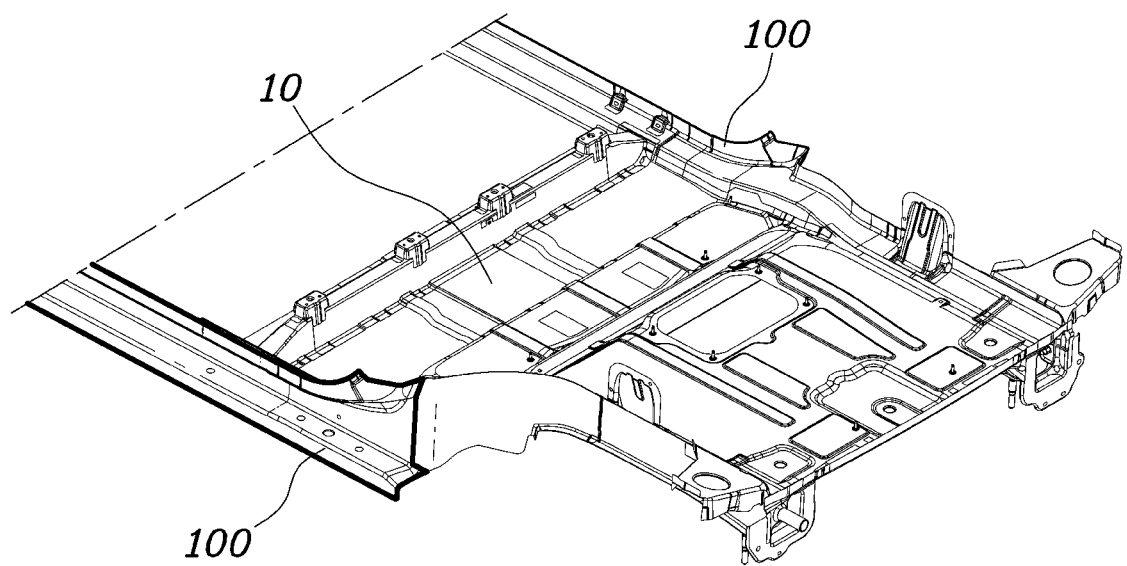
FIGS. 3 and 4 are views respectively illustrating a side sill and an overlapping zone of the vehicle body according to exemplary forms of the present disclosure.
Figure 4:
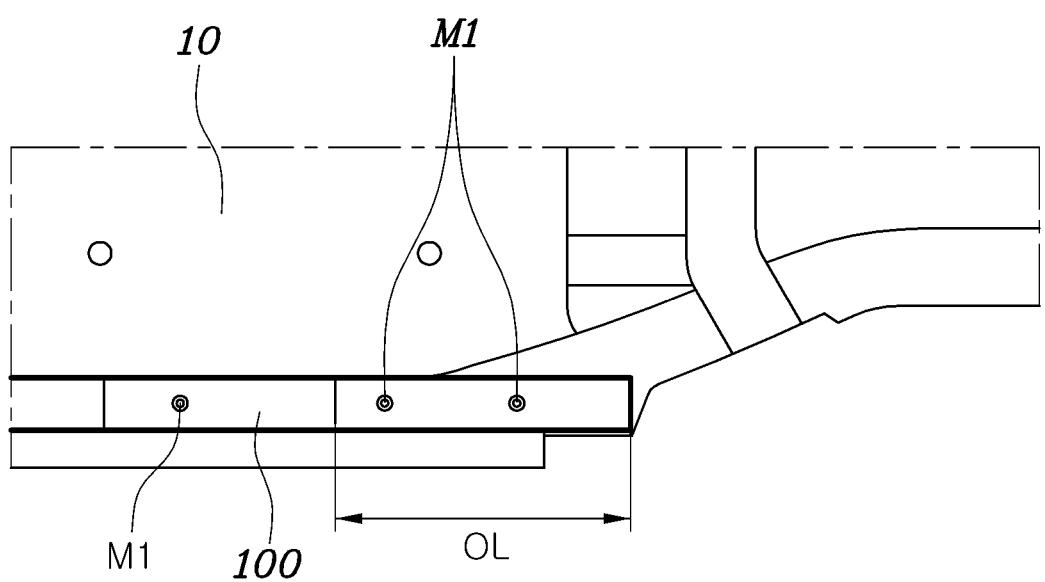
Figure 5:
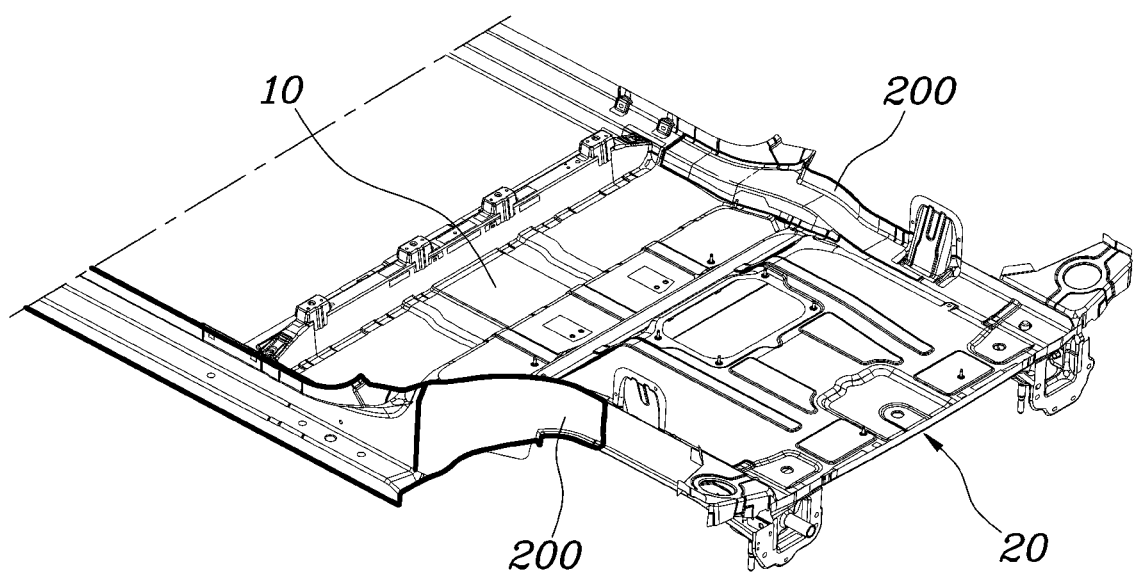
FIGS. 5 and 6 are views respectively illustrating a rear side member and the overlapping zone of the vehicle body according to one form of the present disclosure.
Figure 6:
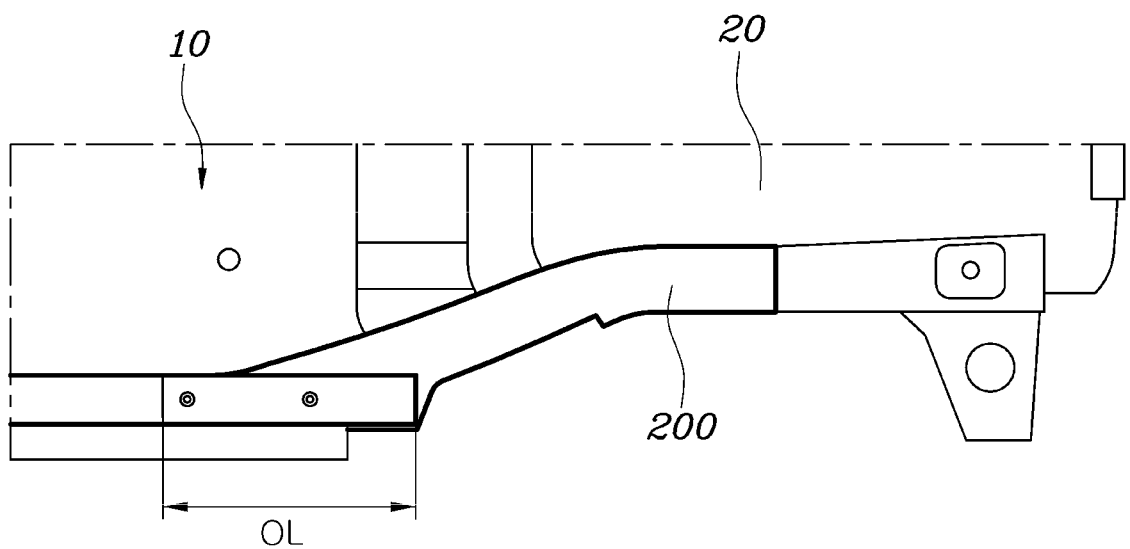
Figure 7:
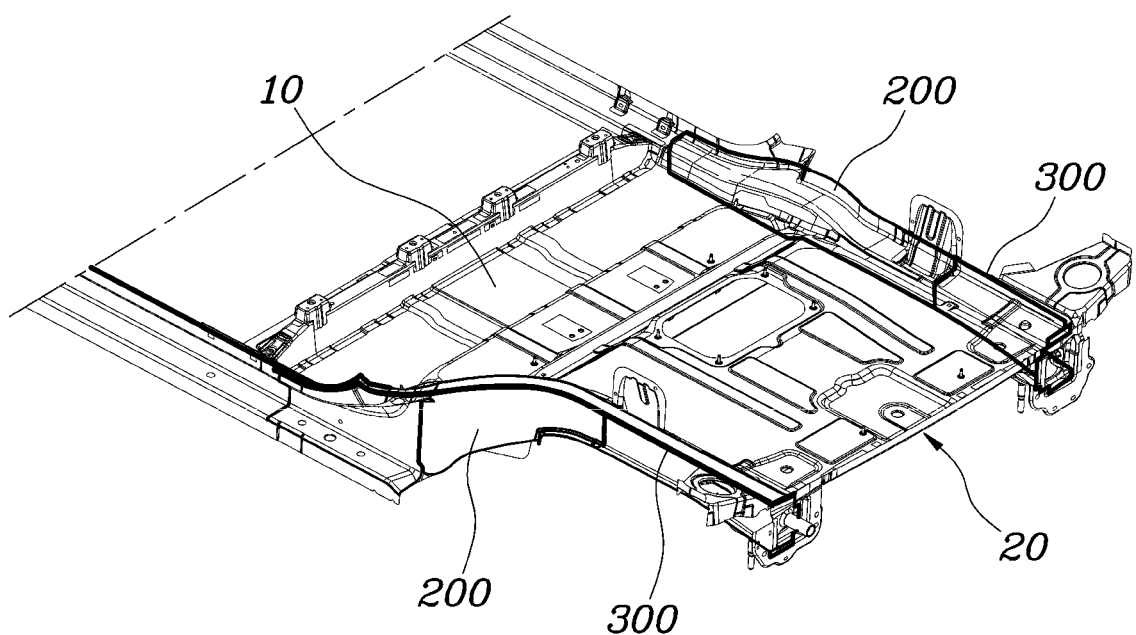
FIGS. 7 and 8 are views respectively illustrating a construction in which the rear side member and a rear extension member of the vehicle body are coupled to each other according to another form of the present disclosure.
Figure 8:
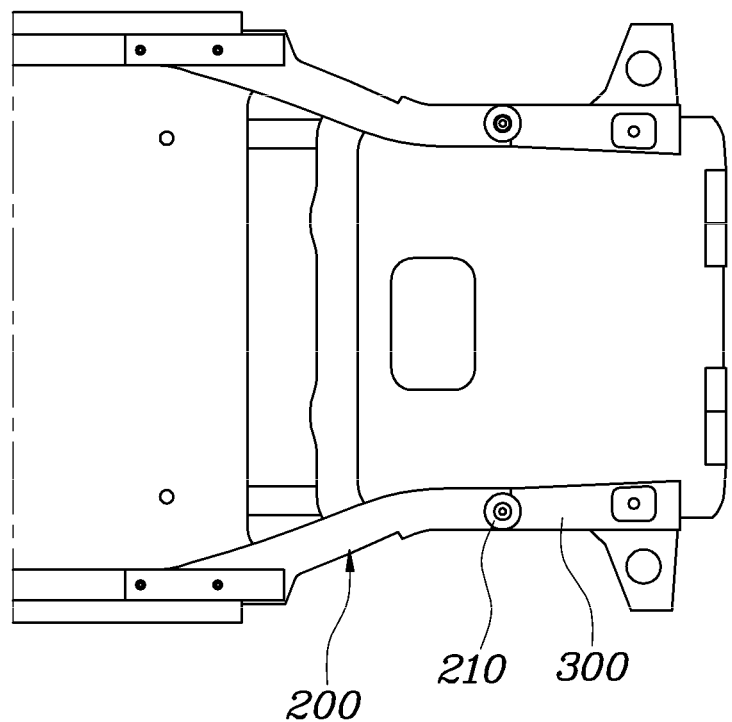

FIGS. 3 and 4 are views illustrating a side sill 100 and an overlapping zone OL of the vehicle body according to exemplary forms of the present disclosure. FIGS. 5 and 6 are views illustrating a rear side member 200 and the overlapping zone OL of the vehicle body according to exemplary forms of the present disclosure. FIGS. 7 and 8 are views illustrating a construction in which the rear side member 200 and a rear extension member 300 of the vehicle body according to exemplary forms of the present disclosure are coupled to each other.

Referring to FIGS. 3 and 4, the side sill 100 is coupled to a side surface of the center floor panel 10 in an anteroposterior direction.

For example, one side surface of the side sill 100 is coupled to the outer side surface of the center floor panel 10. For reference, the side sill 100 may be provided therein with a reinforcing member having a grid cross-section.

Referring to FIGS. 5 and 6, a portion of the front end of the rear side member 200 is coupled to a portion of the rear end of the side sill 100 in the overlapping state. The rear side member 200 extends rearwards along a side surface of the rear floor panel 20 connected to the rear end of the center floor panel 10 and is coupled thereto.

For example, one side surface of the rear side member 200 is coupled to the outer side surfaces of the center floor panel 10 and the rear floor panel 20.

Particularly, in the overlapping zone OL in which the side sill 100 partially overlaps the rear side member 200, the front end of the rear side member 200 is coupled to the side surface of the center floor panel 10, and the rear end of the side sill 100 is coupled to the front end of the rear side member 200 in the overlapping state.

Alternatively, the rear end of the side sill 100 may be coupled to the side surface of the center floor panel 10, and then the front end of the rear side member 200 may be coupled to the side surface of the side sill 100 in the overlapping state.

For reference, because the side surface of the portion at which the center floor panel 10 is connected to the rear floor panel 20 is bent toward the inside of the vehicle body, the rear side member 200 is anteroposteriorly formed at the front end thereof along the side surface of the center floor member, and is bent along the side surface of the rear floor panel 20.

Referring to FIG. 2, the battery 700 is positioned on the lower portion of the center floor panel 10, and the side surface of the battery 700 is mounted on the portion of the side sill 100 in front of the rear side member 200 and the portion at which the side sill 100 overlaps the rear side member 200.

For example, a bracket is provided at the peripheral side surface of the battery 700, and the bracket is disposed at the lower portions of the side sill 100 and the rear side member 200, thereby providing the side sill 100 and the overlapping zone OL with mounting points.

Specifically, the side sill 100, which is positioned in front of the overlapping zone OL, is provided with at least one point (one battery-mounting point), and the overlapping zone OL is provided with at least one point (one battery-mounting point). In one form, each of the side sill 100 and the overlapping zone OL is provided with two or more battery-mounting points M1.

Referring to FIGS. 7 and 8, the vehicle body is provided with the rear extension member 300, which has a strength lower than any of the side sill 100 and the rear side member 200, and the front end of the rear extension member 300 is connected to the rear end of the rear side member 200. The rear extension member 300 extends rearwards along the side surface of the rear floor panel 20 and is coupled thereto.

For example, one side surface of the rear extension member 300 is coupled to the outer side surface of the rear portion of the rear floor panel 20.

Figure 12:
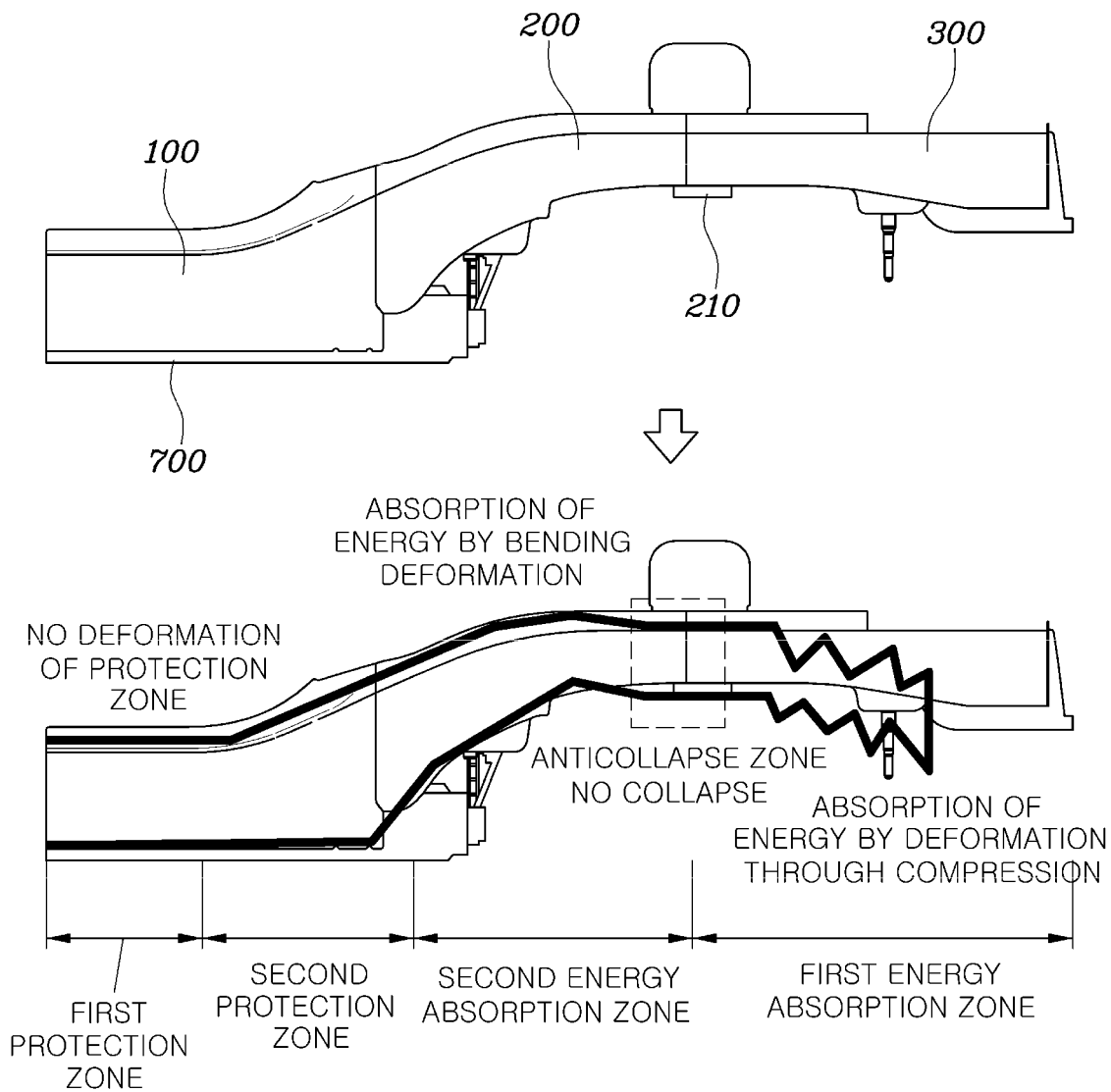
FIG. 12 is a view illustrating deformed shapes of zones of the rear portion of the vehicle body according to an exemplary form of the present disclosure when a collision occurs at the rear portion.

As illustrated in FIGS. 2 and 12, the zone between the portion of the side sill 100 in front of the overlapping zone OL and the rear end of the rear extension member 300 may be divided into a first energy absorption zone, a second energy absorption zone, a first protection zone and a second protection zone.

When a collision occurs at the rear portion of the vehicle, the rear extension member 300 firstly absorbs the collision energy while being deformed through compression and collapsed in the first energy absorption zone because the strength of the rear extension member 300 is lower than that of the rear side member 200 and the side sill 100, which are positioned in front of the rear extension member 300.

Furthermore, because the rear side member 200, which is composed of a material having a strength higher than the rear extension member 300, resides in the second energy absorption zone, the rear side member 200 additionally absorbs the remaining collision energy that is not absorbed in the first energy absorption zone while being deformed by being bent.

Because the battery 700 is present in the second protection zone, deformation of the second protection zone must be prevented. Furthermore, because the second protection zone corresponds to an inflection zone in which the center floor panel 10 and the rear floor panel 20 are connected to each other in the curved state, there is a concern about deformation. Hence, since the overlapping zone OL, in which the side sill 100 and the rear side member 200, which have a high strength, are coupled to each other in the overlapping state, is provided, the strength of the inflection zone is increased, thereby preventing deformation of the inflection zone.

Furthermore, since the first protection zone is composed of the side sill 100, deformation of the first protection zone is also prevented by virtue of the rigidity of the side sill 100.

As described above, since the structure of the rear portion of the vehicle body is improved so as to inhibit or prevent the collision energy from being transmitted to the battery 700, the battery 700 is safely protected, thereby inhibiting or preventing the occurrence of a fire disaster due to breakage of the battery 700 and protecting passengers.

Referring to FIGS. 7, 8 and 12, the rear end portion of the rear side member 200 is coupled to the front end portion of the rear extension member 300 in the overlapping state.

For example, the rear end of the rear side member 200 may be coupled to the side surface of the rear floor panel 20, and the front end of the rear extension member 300 may be coupled to the rear end of the rear side member 200 in the overlapping state.

Alternatively, the front end of the rear extension member 300 may be coupled to the side surface of the rear floor panel 20, and the rear end of the rear side member 200 may be coupled to the front end of the rear extension member 300 in the overlapping state.

A spring seat 210 may be coupled to the lower surface of the portion at which the rear side member 200 overlaps the rear extension member 300.

Accordingly, the strength of the portion at which the rear side member 200 overlaps the rear extension member 300 is increased. Consequently, when a collision occurs at the rear portion of the vehicle, a collapse does not occur at the overlapping portion, and deformation of the spring seat 210 does not occur, thereby preventing the suspension structure supported by the spring seat 210.

Referring to FIG. 2, a first cross member 400 is disposed between the two rear side members 200 and is connected thereto. The first cross member 400 is provided at the middle region with mounting points M1 at which the battery 700 is mounted.

Specifically, the two ends of the first cross member 400 are respectively coupled to the two rear side members 200 positioned behind the overlapping zone OL such that the middle portion of the first cross member 400 extends laterally across the lower surface of the floor panel.

Two battery-mounting points M1 are provided between the center and two lateral ends of the first cross member 400 so as to allow the battery 700 to be mounted thereat.

Furthermore, a second cross member 500 is disposed between the two rear extension members 300 and is coupled thereto.

For example, the two ends of the second cross member 500 are respectively coupled to the two rear extension members 300 positioned behind the spring seat 210 such that the middle portion of the second cross member 500 laterally extends across the lower surface of the rear floor panel 20.

Subframe-mounting points M2, at which a subframe 800 is mounted, are provided at the two ends of the first cross member 400 coupled to the rear side member 200 and at the two ends of the second cross member 500.

Figure 9:
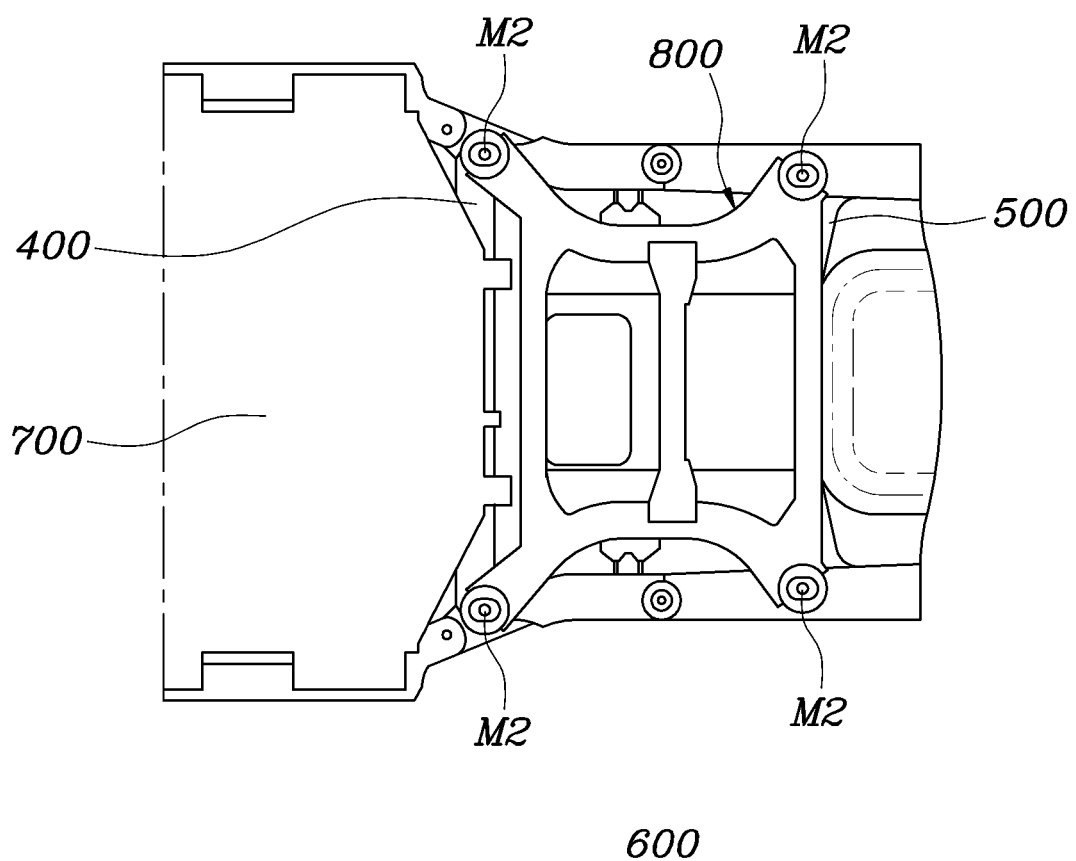
FIG. 9 is a view illustrating a structure in which a subframe is mounted to the vehicle body according to an exemplary form of the present disclosure.

In one form, as illustrated in FIG. 9, two lateral ends of the front end of the subframe 800 are mounted on the two ends of the first cross member 400, and the lateral ends of the rear end of the subframe 800 are mounted on the two ends of the second cross member 500. Accordingly, since the four corners of the subframe 800 are coupled to the rear side member 200 and the rear extension member 300, the subframe 800 is stably coupled to the vehicle body and is supported thereby.

Here, each of the first cross member 400 and the second cross member 500 may be composed of bracket portions, which are coupled to the two ends of the rear side member 200 or the rear extension member 300, and a member portion, which extends between the bracket portions and is integrally formed with the bracket portions.

Alternatively, each of the first cross member 400 and the second cross member 500 may be composed of the bracket portions and the member portion, which are separately prepared.

Figure 13:
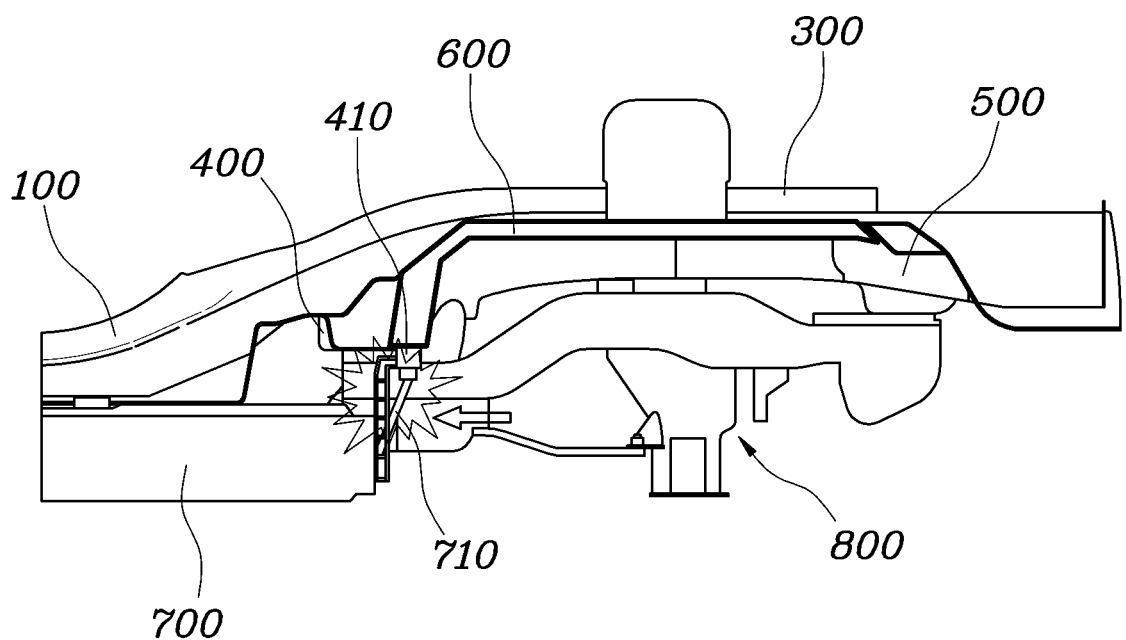
FIG. 13 is a view illustrating the state in which a battery-mounting bracket is broken by a subframe when a collision occurs at the rear portion.

Referring to FIGS. 2 and 13, a battery-mounting portion may be provided on the rear surface of the middle portion of the first cross member 400, and a battery-mounting bracket 710 may be vertically disposed between the battery-mounting portion and the battery 700, and may be coupled thereto.

Specifically, the lower end of the battery-mounting bracket 710 is coupled to the rear end of the battery 700, and the upper end of the battery-mounting bracket 710 is coupled to the battery-mounting portion.

Consequently, since the battery 700 is mounted not only to the side sill 100 and the overlapping zone OL but also to the first cross member 400, it is possible to mount and support the battery 700 more stably.

Figure 10:
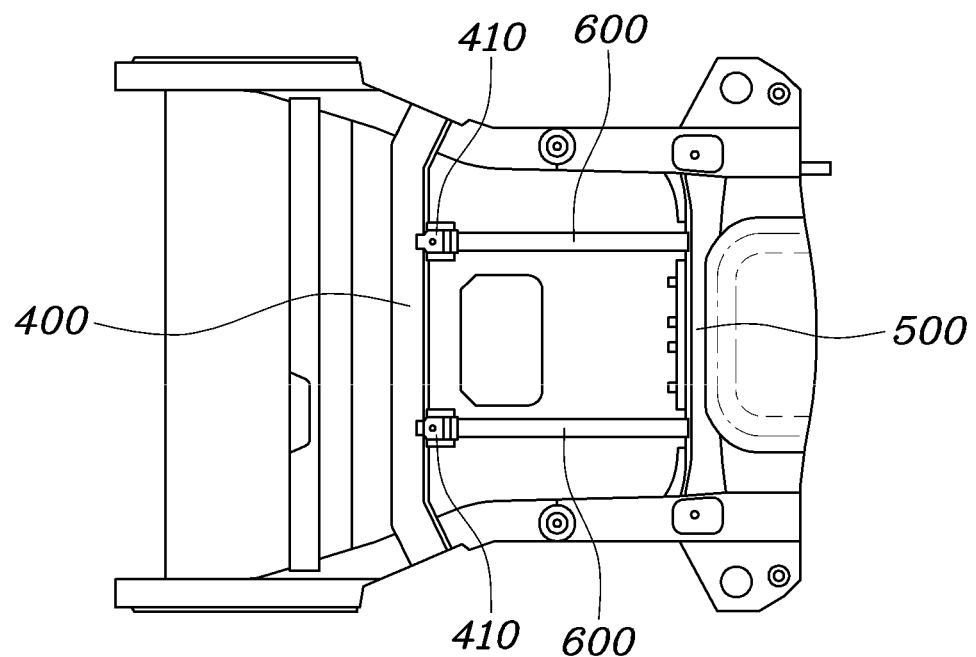
FIG. 10 is a view illustrating the vehicle body according to one form of the present disclosure, in which a mounting bracket, which is a first form of the battery-mounting portion, is additionally coupled thereto.
Figure 11:
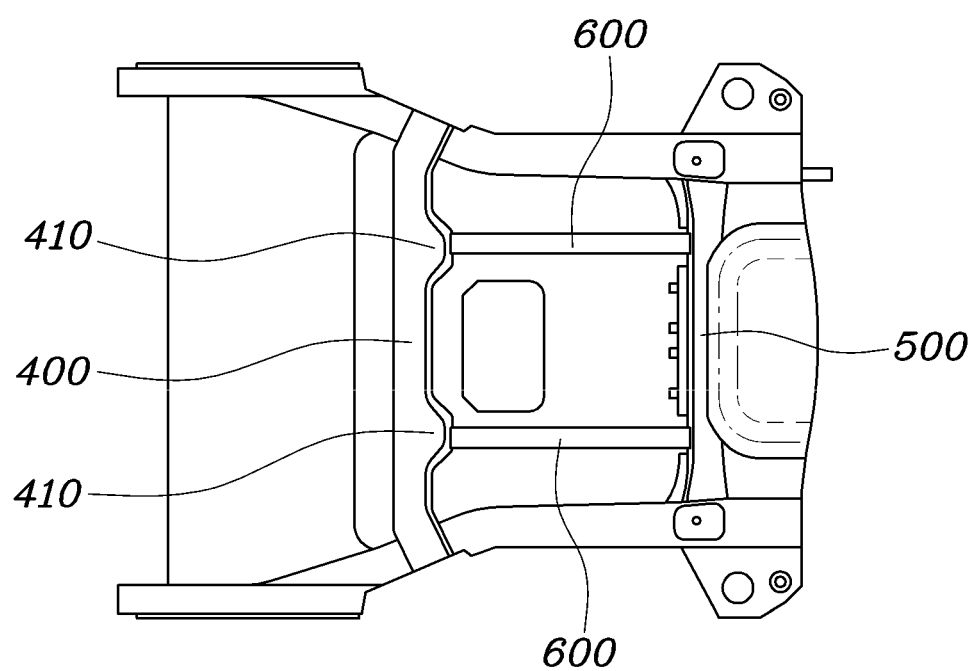
FIG. 11 is a view illustrating the vehicle body according to one form of the present disclosure, in which mounting surfaces, which are a second form of the battery-mounting portion, are formed.

FIG. 10 is a view illustrating the vehicle body according to one form of the present disclosure, in which a mounting bracket 410, which is a first form of the battery-mounting portion, is additionally coupled thereto. FIG. 11 is a view illustrating the vehicle body according to another form of the present disclosure, in which mounting surfaces 420, which are a second form of the battery-mounting portion, are formed.

Referring to FIG. 10, the battery-mounting portion may be constructed such that the mounting bracket 410 is additionally coupled to the rear surface of the first cross member 400.

Referring to FIG. 11, the battery-mounting portion may be constructed such that the mounting surface 420 is formed at the rear surface of the first cross member 400 so as to protrude toward the second cross member 500.

In other words, the battery-mounting portion, which is the battery-mounting point M1, may be constructed such that the additional mounting bracket is coupled to the first cross member 400 so as to allow the battery 700 to be mounted thereon or such that the mounting surface is integrally formed with the first cross member 400 so as to allow the battery 700 to be mounted thereon.

Referring to FIGS. 2 and 3, a reinforcing mounting member 600 may be disposed between the first cross member 400 and the second cross member 500, and may be coupled thereto.

The reinforcing mounting member 600 extends anteroposteriorly between the battery-mounting portion and the front end of the second cross member 500 and is coupled thereto.

Accordingly, since the reinforcing mounting member 600 is disposed between the first cross member 400 and the second cross member 500 and is coupled thereto, the rigidity of the floor panel between the first cross member 400 and the second cross member 500 is increased.

Particularly, since the reinforcing mounting member 600 is connected to the battery-mounting portion, which is the battery-mounting point M1 on the first cross member 400, so as to physically reinforce the battery-mounting portion, it is possible to mount the battery 700 more securely.

In other words, since the battery 700 is securely mounted not only at the battery-mounting points M1, which are positioned at the side sill 100 and the overlapping zone OL, but also at the battery-mounting portion, it is possible to mount the battery 700 more strongly than by using only the battery-mounting bracket 710.

Since the battery 700 is securely mounted at the multiple battery-mounting points M1, when the subframe 800 strikes the battery-mounting bracket 710 in the event of a collision at the rear portion of the vehicle, as illustrated in FIG. 13, the battery-mounting bracket 710 is neither bent nor distorted, and is quickly broken. Accordingly, the rear end of the battery 700 is not bent in any one direction, and the battery 700 is maintained in the original state.

As described above, the present disclosure is constructed to optimize the structure of the rear portion of a vehicle body so as to prevent collision energy from being transmitted to the battery 700. Consequently, since the battery 700 is safely protected, it is possible to inhibit or prevent fire in the event of rupture of the battery 700 and thus to protect passengers.

As is apparent from the above description, according to exemplary forms of the present disclosure, since the structure of the rear portion of a vehicle body is optimize so as to inhibit or prevent collision energy from being transmitted to the battery, fires are prevented upon rupture of the battery and thus the battery and passengers are protected.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A vehicle body for an electrical vehicle, the vehicle body comprising:
 side sills configured to extend anteroposteriorly along side surfaces of a floor panel of the vehicle body and couple to the floor panel;
 rear side members having front end portions configured to overlap rear end portions of the side sills, the rear side members configured to extend rearwards along the side surfaces of the floor panel and couple to the floor panel;
 a battery positioned at a lower portion of the floor panel, wherein the battery is mounted to portions of the side sills in front of the rear side members and to portions at which the side sills overlap the rear side members; and
 rear extension members configured to:
  extend rearwards along the side surfaces of the floor panel and couple to the floor panel,
  have a strength less than a strength of any of the side sills and the rear side members, and
  include front ends connected to rear ends of the rear side members,
 wherein the rear ends of the rear side members are coupled to the front ends of the rear extension members in an overlapping state, and
 wherein the vehicle body further comprises a spring seat coupled to lower surfaces of portions at which the rear side members overlap the rear extension members.

2. The vehicle body according to claim 1, further comprising a first cross member, which is disposed between the rear side members and is coupled thereto and to a middle portion of which the battery is mounted.

3. The vehicle body according to claim 2, further comprising:
 a second cross member disposed between the rear extension members and coupled thereto; and
 a subframe, which is mounted to two ends of the first cross member, which is connected to the rear side members, and to two ends of the second cross members, which are connected to the rear extension members.

4. The vehicle body according to claim 2, wherein the first cross member is coupled to the rear side members, which are positioned behind overlapping zones in which the side sills overlap the rear side members.

5. The vehicle body according to claim 2, wherein the first cross member is provided with a battery-mounting portion on a rear surface of a middle portion thereof, and
 wherein a battery-mounting bracket is vertically disposed between the battery-mounting portion and the battery and is connected thereto.

6. The vehicle body according to claim 5, wherein the battery-mounting portion includes: a mounting bracket, which is additionally coupled to a rear surface of the first cross member, or a mounting surface formed on the rear surface of the first cross member.

7. The vehicle body according to claim 5, wherein the battery-mounting bracket is coupled at a lower end thereof to a rear end of the battery and at an upper end thereof to the battery-mounting portion.

8. The vehicle body according to claim 5, further comprising:
 a second cross member disposed between the rear extension members and coupled thereto; and
 a reinforcing mounting member disposed between the first cross member and the second cross member and connected thereto.

9. The vehicle body according to claim 8, wherein the reinforcing mounting member extends anteroposteriorly between the battery-mounting portion and the second cross member and is connected thereto.

10. A vehicle body for an electrical vehicle, the vehicle body comprising:
 side sills configured to extend anteroposteriorly along side surfaces of a floor panel of the vehicle body and couple to the floor panel;

rear side members having front end portions configured to overlap rear end portions of the side sills, the rear side members configured to extend rearwards along the side surfaces of the floor panel and couple to the floor panel;
a battery positioned at a lower portion of the floor panel, wherein the battery is mounted to portions of the side sills in front of the rear side members and to portions at which the side sills overlap the rear side members;
rear extension members configured to:
   extend rearwards along the side surfaces of the floor panel and couple to the floor panel,
   have a strength less than a strength of any of the side sills and the rear side members, and
   include front ends connected to rear ends of the rear side members;
a first cross member, which is disposed between the rear side members and is coupled thereto and to a middle portion of which the battery is mounted;
a second cross member disposed between the rear extension members and coupled thereto; and
a subframe, which is mounted to two ends of the first cross member, which is connected to the rear side members, and to two ends of the second cross members, which are connected to the rear extension members.

11. The vehicle body according to claim 10, wherein the first cross member is coupled to the rear side members, which are positioned behind overlapping zones in which the side sills overlap the rear side members.

12. A vehicle body for an electrical vehicle, the vehicle body comprising:
   side sills configured to extend anteroposteriorly along side surfaces of a floor panel of the vehicle body and couple to the floor panel;
   rear side members having front end portions configured to overlap rear end portions of the side sills, the rear side members configured to extend rearwards along the side surfaces of the floor panel and couple to the floor panel;
   a battery positioned at a lower portion of the floor panel, wherein the battery is mounted to portions of the side sills in front of the rear side members and to portions at which the side sills overlap the rear side members; and
   rear extension members configured to:
      extend rearwards along the side surfaces of the floor panel and couple to the floor panel,
      have a strength less than a strength of any of the side sills and the rear side members, and
      include front ends connected to rear ends of the rear side members; and
   a first cross member, which is disposed between the rear side members and is coupled thereto and to a middle portion of which the battery is mounted,
   wherein the first cross member is provided with a battery-mounting portion on a rear surface of a middle portion thereof, and
   wherein a battery-mounting bracket is vertically disposed between the battery-mounting portion and the battery and is connected thereto.

13. The vehicle body according to claim 12, wherein the battery-mounting portion includes: a mounting bracket, which is additionally coupled to a rear surface of the first cross member, or a mounting surface formed on the rear surface of the first cross member.

14. The vehicle body according to claim 12, wherein the battery-mounting bracket is coupled at a lower end thereof to a rear end of the battery and at an upper end thereof to the battery-mounting portion.

15. The vehicle body according to claim 12, further comprising:
   a second cross member disposed between the rear extension members and coupled thereto; and
   a reinforcing mounting member disposed between the first cross member and the second cross member and connected thereto.

16. The vehicle body according to claim 15, wherein the reinforcing mounting member extends anteroposteriorly between the battery-mounting portion and the second cross member and is connected thereto.

* * * * *